United States Patent [19]

Sorez

[11] Patent Number: 4,563,229
[45] Date of Patent: Jan. 7, 1986

[54] METHOD AND MEANS FOR THE CONTINUOUS MANUFACTURE OF A FLEXIBLE MULTI-LAYER COMPOUND STRUCTURE OF CONTROLLED PERVIOUSNESS

[75] Inventor: Jean-Claude Sorez, Roubaix, France
[73] Assignee: Prouvost S.A., Roubaix, France
[21] Appl. No.: 579,214
[22] Filed: Feb. 10, 1984

[30] Foreign Application Priority Data

Nov. 21, 1983 [FR] France .................. 83 18771

[51] Int. Cl.⁴ ........................ B65C 1/00
[52] U.S. Cl. .................. 156/64; 156/244.11;
156/309.9; 156/323; 156/322; 156/324;
156/378
[58] Field of Search .............. 156/324, 244.11, 244.22,
156/244.23, 244.18, 64, 378, 309.6, 309.9, 313,
322; 428/315.5, 317.1, 317.5, 317.7

[56] References Cited

U.S. PATENT DOCUMENTS 3,582,430 6/1971 Benigno .................. 156/324 X
3,911,186 10/1975 Trotman .................. 156/64 X
4,099,943 7/1978 Fischman et al. .......... 428/317.7 X
4,264,659 4/1981 Daffenden ................ 428/317.5 X
4,333,786 6/1982 Civardi et al. ............ 156/32 X

OTHER PUBLICATIONS

"Air Permeability of Textile Fabrics", ASTM Test D 737-46, 1946.

Primary Examiner—David Simmons
Attorney, Agent, or Firm—Robert E. Burns; Emmanuel J. Lobato; Bruce L. Adams

[57] ABSTRACT

This method is directed to the continuous making of a flexible compound structure having a controlled perviousness and consisting of an assembly of a textile web, a thermoplastic film and a foam web in a machine where these elements are heated and welded together between a pair of calender cylinders; means are provided for measuring continuously the perviousness of the resultant compound structure; according to the desired degree of perviousness, the welding parameters are adjusted so as to change the linear speed of the structure, and/or the pressure exerted thereon by the calender cylinders and/or the temperature of the heating means; this invention is applicable more particularly in the textile industry for manufacturing products such as wall coverings and the like.

18 Claims, 2 Drawing Figures

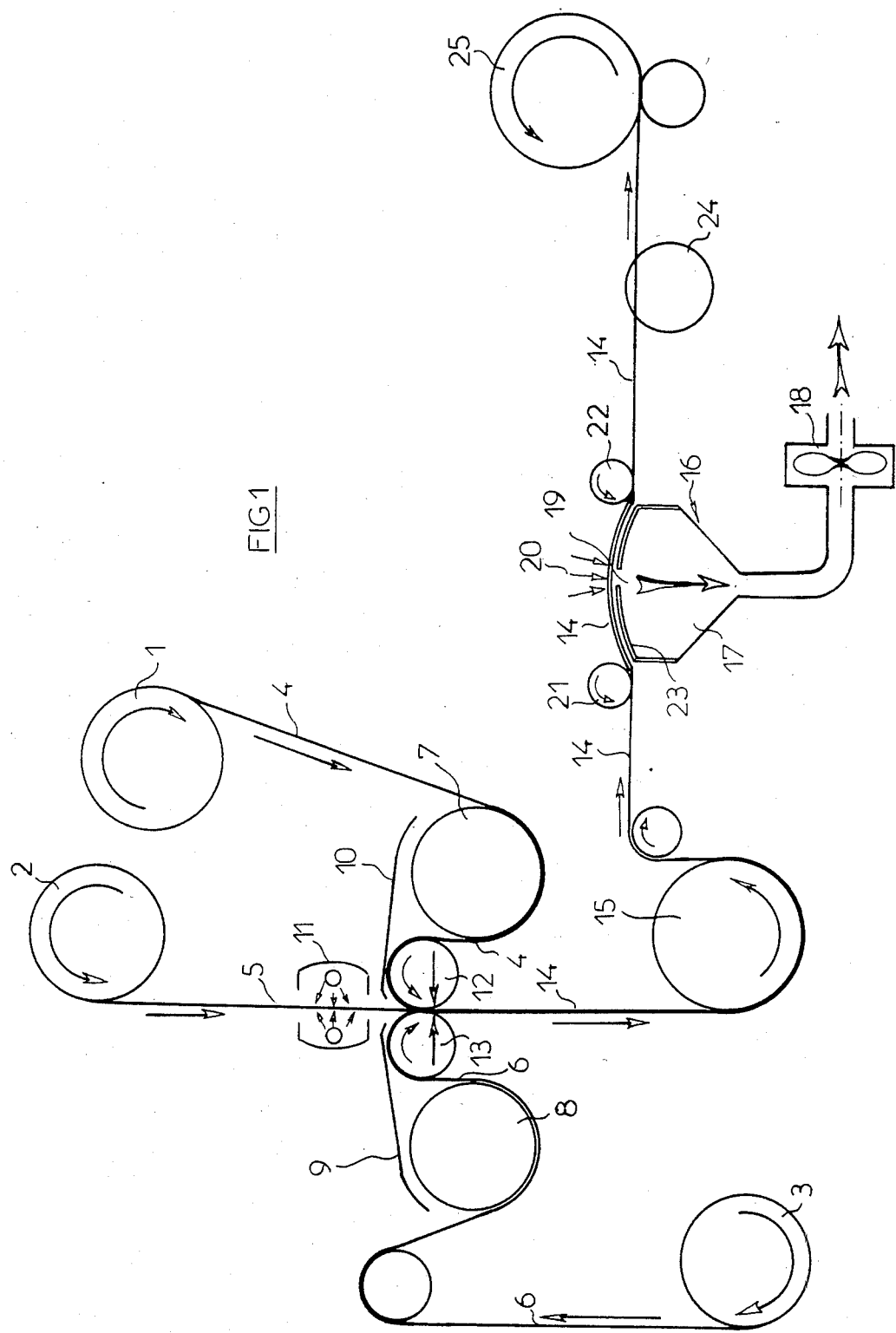

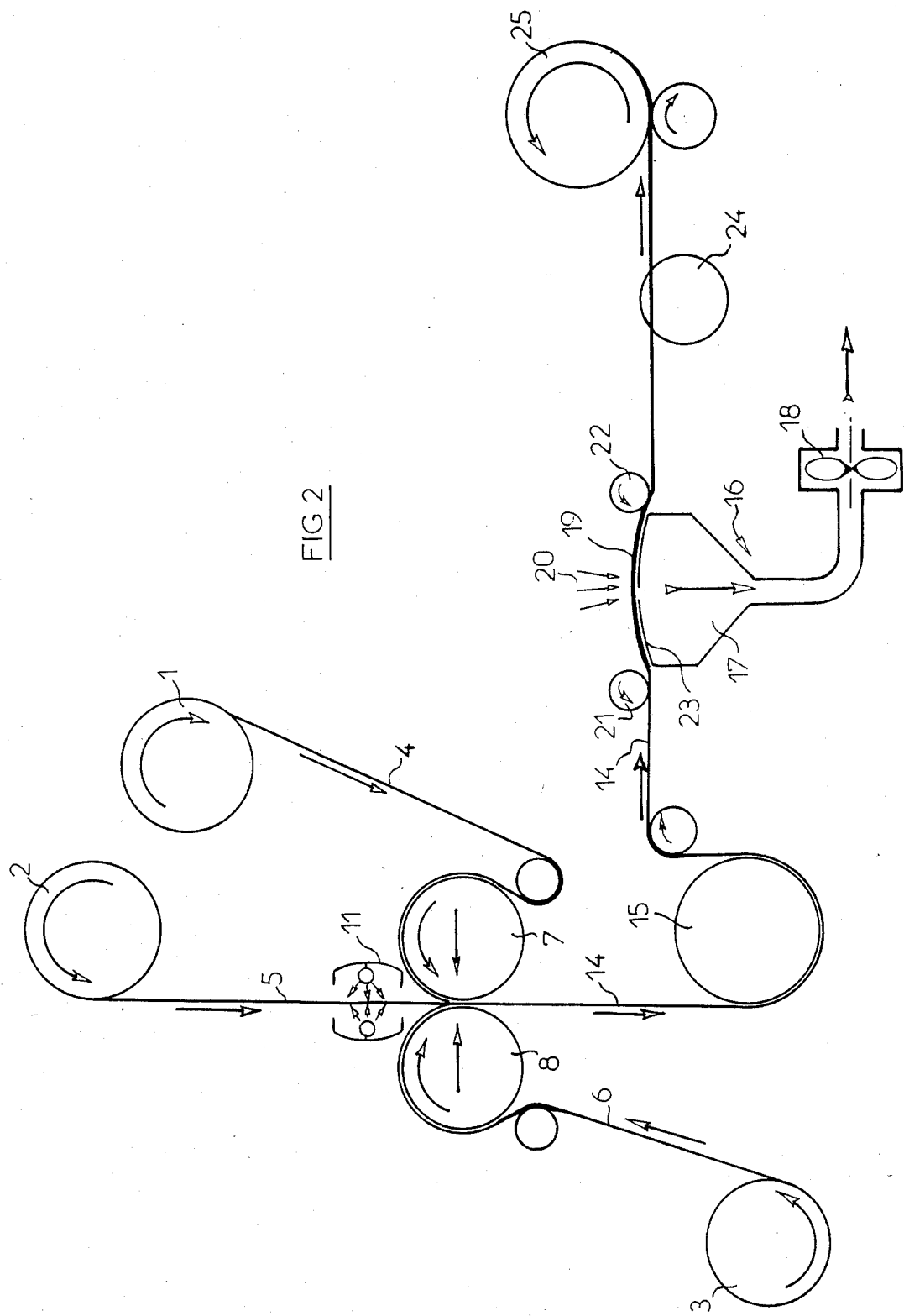

METHOD AND MEANS FOR THE CONTINUOUS MANUFACTURE OF A FLEXIBLE MULTI-LAYER COMPOUND STRUCTURE OF CONTROLLED PERVIOUSNESS

BACKGROUND OF THE INVENTION

1. Field of the Invention

The present invention relates to a method of manufacturing in a continuous process a flexible multi-layer compound structure having a controlled perviousness, and also to means for carrying out this method. This invention is applicable more particularly to the manufacture of wall coverings.

2. The Prior Art

Especially during the last decade, double-width textile wall coverings have become increasingly popular for lining and decorating main-and partition walls. These coverings may consist either of a simple fabric or, in most instances, of compound structures comprising a cloth or a sheet of yarns or fibres bonded to one or a plurality of flexible substrata by means of a pasting or welding process. In many cases these substrata consist of foam webs or sheets, or of thermoplastic films. These wall coverings, manufactured in widths slightly greater than the standard height of house walls, i.e. in widths of the order of 2.7 to 3 meters, can be put up either according to the tension laying method, i.e. by using staples and slightly stretching the wall covering on a frame having its side disposed along the edges of the wall, or according to the paste-and-stretch method, i.e. by pasting locally along stripes about one or two inches wide disposed along the wall edges.

Hitherto known wall coverings may be divided into two main types:

on the one hand, wall coverings which do not constitute a barrier to air and water vapor, and are sometimes referred to as open-cell coverings, and on the other hand, wall coverings constituting a barrier preventing the passage of air and water vapor, which are sometimes referred to as closed-cell coverings.

Open-cell wall coverings are those whose composition is free of any film, sheet or continuous layer or web capable either singly or in combination to prevent the passage of air or water vapor through the coverings.

Included in this range of products are plain fabrics or coverings consisting of a cloth welded by calendering to an open-cell foam sheet by means of a thermoplastic net inserted between the cloth and the foam.

Due to their air-perviousness, these open-cell wall coverings are liable to retain on their surface atmospheric dust forming a deposit by filter effect. This clogging up becomes rapidly visible and is therefore particularly detrimental in the case of light-colored coverings.

As a counterpart of the inconveniences resulting from the accumulation of dust by filter effect, open-cell wall coverings are advantageous in that the walls to which they are applied can 'breath', so that the humidity likely to spread on the wall surface for example by capillary propagation from the house foundations or basement can evaporate continuously.

The composition of closed-cell coverings comprises one or more continuous films, sheets or layer capable either singly or in combination of preventing the passage of air or water vapor through the covering. Such coverings are notably those consisting of cloth welded to a sheet by means of a continuous and relatively thick thermoplastic film inserted between the cloth and the foam, or alternatively wall coverings having a continuous film pasted to their back face. Closed-cell wall coverings through which air cannot pass are free of the above-mentioned inconvenience of dust clogging caused by filter effect.

On the other hand, impervious coverings are objectionable in that they prevent the natural evaporation of the humidity spreading on the wall surface. This is most likely to cause serious damages such as for instance the accumulation of humidity within the walls, which develops mildew and consequently the disintegration of the binder and the spreading of moisture up to the ceilings of the rooms involved.

It is thus clear from the foregoing that a choice should be made between totally impervious and totally pervious wall coverings, with all the advantages and inconveniences resulting therefrom.

Besides, it should be noted that these perviousness or imperviousness properties are also considerably important for other applications such as packing materials, seat upholstery, materials used in the making of shoes, garments and else.

SUMMARY OF THE INVENTION

It is therefore the primary object of the present invention to provide a compound structure of which the perviousness to air and water vapor is controlled and adjusted with a view to obtain an optimal or desired perviousness. The compound structures obtainable by carrying out the method of the instant invention are advantageous notably in that on the one hand their perviousness is sufficient to permit, in the case of wall coverings, the evaporation of the humidity from a wall covered with these products and, on the other hand, their resistance to the passage of air through the same products is sufficient to minimize the filter effect and consequently the clogging of the coverings with dust.

Besides, the method of manufacturing the multi-layer compound structures according to the present invention is a continuous one, thus affording the possibility of making a good quality product at a relatively low cost and a constant control of its perviousness.

Other objects and advantages of the present invention will appear as the following description proceeds, it being understood however that this description should not be construed as limiting the scope of the invention since many changes and variations may be brought thereto without departing from its basic principles.

The method of manufacturing a continuous, compound and flexible multi-layer web having a controlled perviousness, intended notably for use as wall covering consisting of an assembly of two continuous webs of flexible material pervious to air and water vapor, disposed on either side of a continuous film of thermoplastic material to which they are welded, is characterized in that:

The film to be welded is heated by causing same to travel through heating means;

The two continuous webs of flexible material are welded to the opposite faces of the intermediate thermoplastic film by exerting a pressure on the compound structure thus formed;

The permeability of the compound structure is measured continuously;

The welding parameters are set with a view to obtain the desired perviousness.

THE DRAWINGS

The invention will be better understood by reading the following description with reference to the accompanying drawings, in which:

FIG. 1 illustrates in diagrammatic form a first form of embodiment of a machine for carrying out the method of the present invention, and FIG. 2 illustrates diagrammatically a second form of embodiment of a machine for carrying out the method of the present invention.

DESCRIPTION OF THE PREFERRED EMBODIMENTS

Various methods have already been proposed for the continuous manufacture of multi-layer compound structures intended notably for making wall coverings. In the manufacture of such open-cell wall coverings a relatively thin intermediate plastic film or net is used; on the other hand, when a closed-cell wall covering is desired, the intermediate plastic film is relatively thick, but obviously this extra thickness is objectionable in that it imparts a greater rigidity to the compound.

This invention is directed more particularly to the continuous manufacture of a flexible compound structure of which the perviousness to air and water vapor is adjustable. Under these conditions, it will be possible to obtain a final compound structure of which the perviousness can range from a 100 percent imperviousness to a nearly total perviousness or permeability.

The compound structure according to the present invention consists of an assembly of two flexible materials, as a rule in the form of continuous webs permitting the passage of air and water vapor therethrough. These flexible materials may consist for example of a textile web and of a foam web, respectively.

These flexible materials are disposed on either side of a continuous thermoplastic film to which they are welded.

The manufacturing method of the present invention is characterized in that the materials and the film to be welded are heated by causing them to pass through heating means.

Said materials are welded to the opposite faces of the intermediate thermoplastic film by exerting a pressure against the compound consisting of said thermoplastic film sandwiched between said flexible materials.

The permeability of the compound structure is measured continuously during the process.

The welding parameters are set with a view to obtain the desired permeability.

According to a preferred form of embodiment of the method of the present invention, the various materials and the thermoplastic film are heated separately.

Stress should be laid on the fact that the welding parameters are corrected by changing either the rate of feed of the materials and the thermoplastic film through the heating means, or the pressure exerted on the compound during the welding step. The correction may take place by modifying one of said parameters, or a combination of several parameters.

For technical reasons the temperature reaction takes more time than a nearly instantaneous change in the pressure exerted on the compound structure, therefore the correction of the welding parameters will be obtained preferably by modifying during a first step the pressure exerted on the compound structure, a reaction which may be almost instantaneous, and by modifying in a second step the thermoplastic film heating temperature. Since the change in the temperature of the thermoplastic film requires more time, as this change in the temperature variation of the thermoplastic film takes place the pressure exerted on the compound structure will be corrected accordingly in order to maintain the permeability of the compound structure at a constant value equal to the desired value.

FIG. 1 illustrates diagrammatically a machine designed for carrying out the method for the continuous manufacture of a flexible compound structure according to the present invention.

In the example illustrated the compound structure is obtained by assembling a textile web, a thermo-adhesive film and a foam web. However, according to the specific nature of the compound structure to be manufactured, other materials may be substituted therefor.

The plant comprises three reels 1, 2 and 3 delivering simultaneously a first flexible material 4 which, in the selected example, is a textile material, an intermediate thermoplastic film 5 and a second flexible material 6 which, in the same example, consist of foam. The flexible materials 4, 5 as well as the continuous thermoplastic film 5 are stored in the form of relatively long webs.

Preferably, webs slightly broader than the desired final compound product should be used. Thus, for example, in the case of wall coverings, the web width will be preferably of the order of 3 meters, and webs having a width of 3.1 meters are particularly advantageous.

The second flexible material 6 may consist for example of polyurethane foam in the form of a continuous web having a thickness within the range of about 2 to 5 mm.

The continuous thermoplastic film 5 should have a good adherence by hot welding to the flexible materials 4 and 6. Thus, a polyethylene film having a thickness of about 30 to 60 microns or more may be used for this purpose; however, if it is desired to obtain a final compound structure having a proper flexibility, the film thickness should be limited preferably to about 40 microns.

The materials are fed from the reels at a substantially equal linear speed corresponding to the final feed rate of the machine.

Known means, within the knowledges of those conversant with the art, are implemented for preserving the regularity of feed of the flexible materials and also of the thermoplastic film, and also for properly positioning them with respect to each other.

The first web of flexible material 4 paid off the reel 1 is caused to pass round a heating cylinder 7 in order to increase the temperature of this flexible material 4.

Similarly, the other flexible material 6 issuing from reel 3 passes round another heating cylinder 8 in order to increase the temperature of this flexible material 6.

The temperatures to which the cylinders 7 and 8 are raised are adjustable, preferably independently of each other, and these temperatures shall be so adjusted that they are lower than the maximum temperatures which the materials 4 and 6 can withstand, respectively, without undergoing any distortion or modification. In actual practice, the cylinder temperatures are kept within the range of about 50° to 100° C.

The angles of actual contact between the materials 4 and 6 and the corresponding cylinders 7 and 8 respectively are preferably such that said materials 4 and 6 are raised to a temperature very close to that of the corresponding cylinders.

Also preferably, baffles 9 and 10 may be disposed above the cylinders 7 and 8 for retaining the heated air in the area occupied by the flexible materials as they leave said cylinders. In fact, heat losses from these materials 4 and 6 should be kept to a minimum level when the materials leave the heating cylinders 7 and 8.

At the same time, the continuous thermoplastic film 5 is heated as it is unrolled from its reel 2 by causing the film to pass through an infrared heating device 11.

As shown in FIG. 1, the flexible materials 4 and 6 are welded to the opposite faces of the thermoplastic film 5 by means of a pair of calender rollers 12, 13 between which the flexible materials 4, 6 leaving the heating cylinders 7 and 8 are pressed against the intermediate thermoplastic film 5 delivered through the infrared heating device 11.

The adjustable temperature to which the thermoplastic film 5 was raised in this infrared heating device 11 shall be such that it will soften this film 5 at least superficially and thus impart a predetermined adhesiveness thereto. This temperature is preferably of the order of about 120° to 200° C.

For this purpose, the compressive force exerted by the calender rollers 12 and 13 is preferably adjustable, for example by means of a fluid-actuated cylinder (not shown), whereby the materials 4 and 6, and the thermoplastic film 5, are more or less pressed against each other during their passage between the calender rollers. Thus, the flexible materials 4 and 6 and the thermoplastic film 5 are bonded by welding as they emerge from these rollers 12 and 13 in order to constitute a compound structure 14.

In the example shown in FIG. 1, this compound structure 14 is firstly cooled by passing round a cylinder 15 of which the temperature is kept at a relatively low level by auxiliary cooling means (not shown).

It is another feature characterizing the method of the present invention that the permeability of the compound structure 14 is measured continuously.

As it leaves the cooling cylinder 15, this compound structure 14 is tested by means of a device 16 for continuously measuring the permeability of the structure and servo-controlling the welding parameters.

This device 16 comprises essentially a housing 17 connected to a pump 18 capable of producing in the housing 17 a pressure differential with respect to the external or atmospheric pressure.

In the case illustrated in FIG. 1, the vacuum method is obtained preferably in the housing 17, in the form of embodiment of the device 16; however, a pressure above the atmospheric value could also be created in the housing 17, if desired.

This housing 17 is further provided with a top aperture or slot 19 over which the compound structure 14 is caused to move so as to occlude said aperture 19.

The compound structure 14 must necessarily be pressed against the aperture 19 so that the air sucked through the aperture 19 is compelled to flow through the compound structure 14 but cannot seep between the compound structure 14 and the top surface of housing 17.

Advantageously, in order to properly press the compound structure 14 against the slot 19, the top face of housing 17 is made slightly bulged or convex, and moreover presser rollers 21 and 22 are provided before and after the housing 17. Besides, the top surface 23 of housing 17 on which the compound structure 14 is caused to slide is accurately polished and treated to make it nonadherent, for instance by lining this surface 23 with a Teflon film.

A predetermined vacuum can be maintained in the housing 17 by operating the pump 18. By measuring the air throughput of this pump 18, it is possible to know exactly and continuously the permeability of the compound structure 14 since the pump throughput corresponds to the air flowing through the compound structure 14 before penetrating into the slot 19. This air flowing through the pump 18, whether by suction or under pressure, can be measured without difficulty for example by using a hot-wire outputmeter. The signal delivered by this outputmeter is therefore proportional to the permeability of the compound structure 14. By analyzing the output signal delivered by the outputmeter in comparison with a predetermined threshold it is possible to check at any time and continuously the perviousness of the compound structure 14 thus obtained.

This compound structure 14, as it emerges from the device 16, is cut to the proper width by means of known means 24 such as cutters, and subsequently rolled round a spool 25.

It is another object of the present invention to permit the adjustment of the perviousness to the desired value after its measurement. To this end, the machine will comprise means for servo-controlling the welding parameters of the compound structure 14.

The welding parameters are the heating temperatures of materials 4 and 6, respectively, and also of the thermoplastic film 5, the linear velocity of the compound structure through the machine and the calendering pressure exerted between the rollers 12 and 13. By changing one of these parameters, or a plurality of them taken in combination, it is possible to change the welding parameters and consequently the permeability or perviousness of the final compound structure 14.

In actual practice, however, it takes more time to change the heating temperature than for instance the calendering pressure or the feed rate. Therefore, as a rule the servo means will react forthwith firstly on the calendering pressure or on the feed rate, and then, due to the thermal inertia, the thermoplastic film heating temperature will be modified on the whole by controlling the infrared radiation of the heating device 11.

Thus, for example, when the temperature of the thermoplastic film 5 is relatively low, i.e. slightly higher than the minimum temperature permitting an adherence by contact and if at the same time the crushing action exerted by the calendering cylinders 12 and 13 is moderate, then the thermoplastic film will preserve after the welding step a scarcely modified structure and the compound product 14 thus obtained has a low perviousness to air and water vapor.

In contrast thereto, when the temperature of the thermoplastic film 5 issuing from the infrared heating device 11 is relatively high, that is, slightly lower than the maximum temperature beyond which the film consistency would be impaired, and if at the same time the pressure exerted by the calender rollers 12 and 13 is considerable, the continuity of the thermoplastic film is lost and the compound structure 14 thus obtained has a high perviousness to air and water vapor.

It is possible to change the above-defined parameters within relatively wide limits so that a complete range of permeabilities can be obtained for the compound structure manufactured according to the method of the present invention.

When the linear velocity of the webs and film through the machine is increased, the perviousness of the compound structure is reduced, and vice-versa.

If the permeability or perviousness is measured from the number of liters of air flowing in one second through one square meter of the compound structure to which a pressure corresponding to 20 millimeters of water is applied between its two faces, it may be considered that a pervious covering of the open-cell type has a perviousness of the order of 500 units as defined hereinabove. The compound structures obtained according to the present invention may have a perviousness within the range of 0 to 500 units; however, practical tests proved that a perviousness of the order of 20 units is satisfactory in the specific case of a wall covering.

The machine illustrated diagrammatically in FIG. 2 is substantially the same as the one shown in FIG. 1, except that the cylinders 7 and 8 for heating the flexible materials 4 and 6 act at the same time as calender cylinders. Therefore, in this modified embodiment, the calender cylinders 7, 8 are provided with heating means, so that the machine is simplified accordingly; however, it should be noted that in this case the pre-heating step is applied not to the faces of the flexible materials 4 and 6 which are to be pressed against the thermoplastic film 5 but to their opposite faces: thus, the heat from the cylinders 7 and 8 to said materials 4 and 6 will be transmitted through said materials, whereby this type of machine will be used more particularly for such applications wherein said materials 4 and 6 are relatively thin, that is, have a thickness not in excess of 4 millimeters.

Preferably, the operating surface of cylinders 7 and 8 are lined with non-adherent Teflon.

In the above-described examples the thermoplastic film 5 is supplied from a reel 2; however, it is also possible to utilize a thermoplastic film delivered directly from an extruder provided with a flat nozzle, and in this case the infrared heating device 11 may be dispensed with.

This modification is advantageous in that the film thickness can be modified very easily, thus affording an additional welding parameter.

Of course, other forms of embodiment of the present invention may readily occur to those conversant with the art without departing however from the basic principles of the invention.

What is claimed is:

1. Process for continuously producing flexible laminated material pervious to air and water vapor, comprising a film of thermoplastic material sandwiched between two layers of supple material permeable to air and water vapor which comprises:
   continuously supplying said thermoplastic film and said two layers of supple material at substantially the same rate,
   separately and independently heating said film and said layers to independently controlled temperatures, said film being heated to a sufficiently high temperature to soften said film at least superficially and thereby impart a predetermined adhesiveness thereto,
   bringing said film and said two layers of supple material together with said film interposed between said two layers of supple material and passing the thus assembled film and layers of supple material between pressure rollers at controlled speed and with controlled pressure to weld said film and layers of supple material together to form laminated material,
   the permeability of the laminated material thus formed to air and water vapor being a function of the following parameters, namely the temperature to which said layers of supple material and particularly said film are heated, the pressure exerted on the assembled film and layers by said pressure rollers and the speed at which said assembled film and layers are pressed between said pressure rollers,
   continuously measuring the permeability to air of the laminated material exiting from said pressure rollers and varying at least one of said parameters to obtain a predetermined permeability.

2. A process according to claim 1, in which said film is heated to a higher temperature than said layers of supple material.

3. Process according to claim 1 in which said film is heated by subjecting opposite sides of said film to infrared radiation.

4. Process according to claim 1, in which said layers of supple material are heated by contact with heated rolls engaging the faces of said layers which subsequently engage said film.

5. Process according to claim 1, in which said pressure rollers are heated and in which said layers of supple material are heated by bringing them into contact with said heated rollers respectively prior to engagement of said layers with said film.

6. Process according to claim 1 in which permeability of the laminated material is continuously measured by passing air through said material and measuring the flow of air through the material.

7. Process according to claim 1, in which the parameters of welding said supple layers and film together are corrected by modifying the rate at which said supple layers and said film are fed through the heating means and between said pressure rollers.

8. Process according to claim 1, in which the parameters of welding said supple layers and said film are corrected by modifying the pressure exerted by said pressure rollers on said supple layers and film.

9. Process according to claim 1 in which the parameters of welding said supple layers and said film are corrected by modifying the temperature of the means for heating the plastic film.

10. Process according to claim 1 in which the parameters of welding said supple layers and said film are corrected by modifying the temperature to which said supple layers are heated.

11. Process according to claim 1, in which said plastic film is extruded and in which the parameters of welding said supple layers and said film are corrected by modifying the thickness of said film.

12. Apparatus for continuously producing flexible laminated material pervious to air and water vapor comprising;
   means for continuously supplying at a controlled rate two bands of supple material pervious to air and water vapor and a film of thermoplastic material
   means for separately and independently heating said film and said bands of supple material to independently controlled temperatures,
   means for bringing said film and said bands of supple material together with said film sandwiched between said bands and passing the assembled film and bands between pressure rollers having means for applying controlled pressure to said assembled film and bands to weld said film and bands together to form laminated material having a permeability to air and water vapor which is a function of the following parameters, namely the temperature to which said bands and particularly said film are heated by said heating means, the pressure exerted by said pressure rollers and the speed at which said film and bands are passed between said pressure rollers, and means for continuously measuring the permeability to air of the laminated material exiting from said pressure rollers and varying at least one of said parameters to obtain a predetermined permeability.

13. Apparatus according to claim 12, in which said means for continuously measuring the permeability of said laminated material comprises a housing having a top surface with a slot over which said laminated material continuously passes, means for evacuating said housing and means for measuring the flow of air through said laminated material into said housing.

14. Apparatus according to claim 13 in which said top surface is convex and further comprising guide rollers for holding said laminated material in contact with said top surface.

15. Apparatus according to claim 12, in which said means for heating said bands of supple material comprises separate heated rollers around which said bands pass, said heated rollers engaging the sides of said bands which later engage said film.

16. Apparatus according to claim 15, further comprising means for inhibiting cooling of said bands in passing from said heated rollers to said pressure rollers.

17. Apparatus according to claim 12, in which said pressure rollers are heated and in which said bands are brought into engagement with surfaces of said pressure rollers prior to engagement of said bands with said film.

18. Apparatus according to claim 12, in which said means for heating said film comprise radiant heaters disposed on opposite sides of said film passing from said supply means to said pressure rollers.

* * * * *